United States Patent [19]

Fisher

[11] Patent Number: 4,544,304
[45] Date of Patent: Oct. 1, 1985

[54] ICE AGGREGATE ROAD AND METHOD AND APPARATUS FOR CONSTRUCTING SAME

[75] Inventor: Edwin N. Fisher, Belle Center, Ohio

[73] Assignee: Atlantic Richfield Company, Los Angeles, Calif.

[21] Appl. No.: 538,699

[22] Filed: Oct. 3, 1983

Related U.S. Application Data

[62] Division of Ser. No. 176,554, Aug. 8, 1980, Pat. No. 4,440,520.

[51] Int. Cl.$^4$ ............................................. E01C 3/06
[52] U.S. Cl. ....................................... 404/17; 404/83; 404/101; 404/108; 37/196; 37/219
[58] Field of Search .................... 404/17, 83, 96, 101, 404/105, 106, 108, 110, 111, 118; 37/219, 223, 224, 196, 197

[56] References Cited

U.S. PATENT DOCUMENTS

| | | | |
|---|---|---|---|
| 675,694 | 6/1901 | Whinery | 404/79 X |
| 962,209 | 6/1910 | Gailor | 404/77 X |
| 1,144,444 | 6/1915 | Sutherland | 37/196 X |
| 1,247,271 | 11/1917 | Hines | 404/77 |
| 2,384,395 | 9/1945 | Payne | 404/108 X |
| 2,789,485 | 4/1957 | Lindgren | 404/106 |
| 3,035,499 | 6/1962 | Domenighetti | 404/105 |
| 3,120,927 | 2/1964 | Holland | 404/111 X |
| 3,302,975 | 2/1967 | Vandenberg | 37/219 X |
| 3,368,292 | 2/1968 | Prinoth . | |
| 3,371,586 | 3/1968 | Nikolaev et al. | 404/91 |
| 3,818,711 | 6/1974 | Condo et al. | 405/129 |
| 3,902,666 | 9/1975 | Ito et al. | 404/94 |
| 3,986,783 | 10/1976 | Rowley et al. | 404/95 |
| 4,056,328 | 11/1977 | Maxey | 404/96 |
| 4,440,520 | 4/1984 | Fisher | 404/17 X |

OTHER PUBLICATIONS

Proceedings of the Symposium: Surface Protection Through Prevention of Damage (Surface Management) Focus: The Artic Slope, Mar. 1978, Anchorage, Alaska, pp. 176–189.
Design Manual: Cold Regions Engineering, NAVFAC DM-9, Dec., 1967, pp. 9-12-30.
Adam, Kenneth, "Building and Operating Winter Roads in Canada and Alaska", Department of Indian and Northern Affairs, 1978, Ottawa, Canada, pp. 59–61.
Fisher, Edwin N., Ice Aggregate Road Construction, Alaskan Gas Study Company, Fairbanks Field Test Interim Report, 2/22/77–3/8/77.
Fisher, Edwin N., Development of the Ice Aggregate Construction System, Alaskan Arctic Gas Study Company, Aug. 1977.

*Primary Examiner*—James A. Leppink
*Assistant Examiner*—Beverly E. Hjorth
*Attorney, Agent, or Firm*—Albert C. Metrailer

[57] ABSTRACT

An ice aggregate road structure and apparatus for constructing. The road structure comprises crushed ice aggregate from which fines smaller than 0.1 inch have been removed which aggregate is placed in the desired shape and then bonded by a deeply penetrating application of water which bonds aggregate particles at their points of contact. The apparatus includes a distribution box for receiving ice aggregate and distributing it over a road section to be paved coupled with a bond water distributing means for quickly applying bond water after proper distribution and shaping of the aggregate. The distribution and water spray elements are carried on rails which are in turn supported from a pair of spaced apart carriages containing water heating and pumping means and appropriate power sources for operating the equipment. The carriages are spaced apart to allow trucks to deliver aggregate. The distributing means support elements may be inclined to increase the elevation of road surface or to generate bank in the road. The entire apparatus is designed to move forward over each section of road immediately after construction so that the road structure may be produced without disturbing the underlying earth surface.

12 Claims, 11 Drawing Figures

FIG. 5

ICE AGGREGATE ROAD AND METHOD AND APPARATUS FOR CONSTRUCTING SAME

This is a division of application Ser. No. 176,554, filed Aug. 8, 1980, now U.S. Pat. No. 4,440,520.

BACKGROUND OF THE INVENTION

1. Field of the Invention

The present invention is related to civil structures such as a road for use in cold climates, as well as a machine and technique for constructing same. More particularly, the present invention is directed towards a method and apparatus for constructing a novel road whose principal component consists of a crushed ice aggregate.

2. Description of the Prior Art

Wintertime work in environmentally sensitive parts of the arctic and sub-arctic often requires that access roads, work pads and air strips be constructed of non-permanent materials which will not be detrimental to the underlying native vegetation.

The prior art has recognized the unique problems surrounding the construction of a suitable roadway in such cold climates. In the past, a common solution has been to construct such roads of ice. For example, the Rowley et al U.S. Pat. No. 3,986,783 teaches a method and machine for constructing ice roads upon snow-covered regions. The machine gathers snow from the region upon which the road is to be built, heats the gathered snow until it is partially melted and becomes slush, and then spreads the slush to form the road upon refreezing. Other U.S. patents of which I am aware which also relate to ice roads formed from snow include the Nokolaev et al U.S. Pat. No. 3,371,586 and the Condo et al U.S. Pat. No. 3,818,711.

However, contrary to popular opinion, in many parts of the high latitudes very little snow falls, and what does fall is not predictable and seldom remains in a uniform distribution over the land surface because of incessant transport by the wind. As a consequence, snow is often found to be an unreliable material of construction therefore severely limiting the known prior art techniques of utilizing snow to construct ice roads.

In contrast, the occurrence of sub-freezing temperatures and consequent freezing of the surfaces of lakes and rivers is highly predictable and is uniform over large regions. Ice therefore appears to be a more readily available base material from which roadways in cold climates can be constructed. Of course, it would be necessary to mine or harvest the ice preparatory to constructing the desired road. Fortunately, the technology of mining or harvesting ice was developed years ago when such ice was the primary source of refrigeration during warmer periods of the year. However, to the best of my knowledge, the use of such ice as a construction material for wintertime temporary structures such as roads or the like has, prior to my invention, not been utilized.

In a publication entitled: "Building And Operating Winter Roads In Canada And Alaska" by Kenneth M. Adam on behalf of the Canadian Department of Indian and Northern Affairs, (believed published in 1978), the author describes an aggregate ice road whose "development was inspired by Alaskan Arctic Gas Pipeline Company as a technique to protect sensitive terrain from heavy traffic in areas where a lack of snow or lack of available water precludes the use of snow roads or solid ice roads." (Page 59). The aggregate ice road described by this author is believed derived from earlier studies and experiments I had performed in Fairbanks, Alaska, on behalf of the Alaskan Arctic Gas Pipeline Company. The author in this publication describes an aggregate ice road constructed utilizing a medium-sized tractor to pull the aggregating machine, a front-end loader, several dump trucks, a medium sized crawler tractor with blade for shaping the road, and a water tanker truck with spray bar for binding the aggregate. The technique and apparatus therein described calls for mining the aggregate using a roto-tiller and then transporting the ice aggregate by front-end loaders and dump trucks to the site. The loaded trucks dump the aggregate directly on the site, whereafter the crawler tractor shapes the road to the desired width and thickness. Water trucks are then used to finish the road by sprinkling with one inch of water. The author concludes that: "After sprinkling, several hours should elapse before heavy or large numbers of vehicles are allowed on the road. This will allow time for the bonds between aggregate particles to freeze solidly before the road is opened to traffic." (Page 61).

While the foregoing article by Mr. Adam summarizes my earlier experimental work as of around March, 1977, the state of the art at that time was replete with several major disadvantages. Initially, the several large pieces of different equipments required to build the road did not lend the technique to rapid or efficient construction. Further, my field tests conducted in Fairbanks did not encompass all of the conditions likely to be encountered in the high latitudes, and, consequently, left many questions unanswered. For example, the test sections had been placed over a relatively smooth, hard subsurface. Also, although the test sections constructed during the field test had successfully withstood severe heavy equipment loading, such loading was not done until several hours had elapsed from the time of spraying. Finally, the field tests at Fairbanks had been conducted with ambient temperatures above 0° F., and no actual field experience was obtained at lower temperatures (e.g., −20° to −40° F.).

Since the initial series of tests described above, I have further refined my technique for constructing an ice aggregate road in extremely cold (e.g., below −45° F.) temperatures, and have developed an apparatus which is uniquely designed to construct a smooth ice aggregate surface over uneven terrain and which permits near immediate use of the finished surface. It is towards this end that the present invention is advanced.

OBJECTS AND SUMMARY OF THE INVENTION

It is therefore a primary object of the present invention to provide an ice aggregate structure, such as a road, and a method and apparatus for constructing same, which overcomes the deficiencies noted above with respect to the prior art.

Another object of the present invention is to provide a practical technique for constructing an ice aggregate road in high latitudes where temperatures are encountered below −45° F.

A further object of the present invention is to provide a method of constructing an ice aggregate road which provides sufficient strength for heavy equipment loading within minutes after construction.

An additional object of the present invention is to provide a novel and unique machine for placing, grading and bonding ice aggregate to the route desired for a roadway which is self-contained and self-sufficient and which is capable of operating from the surface over which it is constructing.

A still further object of the present invention is to provide an ice aggregate placement and bonding machine which is designed to construct a smooth ice aggregate surface over uneven terrain, which may change grade as required, and which can bank road curves as necessary.

Another general object of the present invention is to provide a crushed ice distributing and bonding machine for constructing, on a continuous basis, roads and other civil structures over natural, perhaps uneven, terrain without any machinery contact with the terrain.

The foregoing and other objects are attained in accordance with one aspect of the present invention through the provision of a method of building a road suitable for use in cold climate, comprising the steps of crushing ice to form an ice aggregate, removing most of the ice particles from the aggregate which are smaller than a particular size, placing the resulting ice aggregate over the route desired for the road, and then bonding the upper portion of the placed ice aggregate. The bonding step includes the step of spraying water onto the top surface of the placed ice aggregate. The bond water is preferably heated. The method further contemplates the step of preventing evaporative cooling of the heated spray water by substantially enclosing the area between the source of the heated spray water and the top surface of the placed ice aggregate. The source of spray water may be passed over the top surface of the placed ice aggregate in a single pass or in multiple passes.

In accordance with another aspect of the present invention, there is provided apparatus for constructing an ice aggregate road, which comprises means adapted to receive ice aggregate for distributing it over a portion of the route desired for the road, and means operatively coupled to the distributing means for applying bond water to the top surface of the distributed ice aggregate. Means are also provided for supporting the ice aggregate distributing means and the bond water applying means for reciprocal movement over the portion of the road being formed. Means are also operatively coupled to the supporting means for transporting same from one portion of the road to the next adjacent portion upon completion of construction of the first portion of the ice aggregate road. The transporting means is adapted for movement over that portion of the ice aggregate road just completed.

In accordance with another aspect of the present invention, means are preferably provided for selectively controlling the transverse angle of inclination of the supporting means with respect to the portion of the road under construction whereby such portion may be constructed with a bank. Means may also be provided for interconnecting the supporting means and the transporting means for selectively raising and lowering the supporting means.

In accordance with more specific aspects of the present invention, the transporting means may include first and second wheeled carriages or modules which are respectively positioned adjacent each end of the supporting means and which are interconnected by a transverse frame member. The space between the first and second wheeled carriages is adapted to receive means, such as a dump truck, for providing the ice aggregate to the distributing means. The first and second wheeled carriages more particularly include means for housing an operator of the apparatus, means for containing the bond water, means for pumping the bond water to the bond water applying means, means for heating the bond water and means for providing transport power.

In accordance with other specific aspects of the present invention, the distributing means comprises hopper means including side walls, an open top for receiving, an open bottom for distributing and a rear wall for grading the ice aggregate over the portion of the road being constructed. The bond water applying means is preferably positioned rearwardly of and adjacent to the rear wall of the hopper means. The bond water applying means more particularly may include a plurality of spray nozzles connected to a common source of bond water and positioned in a spaced relationship to the top surface of the distributed portion of the ice aggregate. Means are also included for providing a substantially vapor saturated region between the spray nozzles and the top surface of the ice aggregate, such means preferably comprising means for substantially enclosing the area between the spray nozzles and the top surface of the ice aggregate for preventing evaporative cooling of the bond water, such enclosing means preferably including a flexible skirt.

In accordance with more specific aspects of the present invention, the bond water applying means further includes a source of bond water, a supply pipe for delivering bond water to the spray nozzles from the source, a return pipe connected to the supply pipe for returning unsprayed bond water back to the source, and means for causing continuous circulation of the bond water through the source, the supply pipe and the return pipe to prevent freezing of the bond water. The spray nozzles each preferably include spring-loaded check valve means for preventing spraying of the bond water therefrom until the pressure in the supply pipe exceeds a predetermined controllable amount. The spray nozzles are preferably arranged substantially linearly across the rear edge of the distributing means.

In accordance with yet another aspect of the present invention, there is provided a method of constructing an ice aggregate road in cold climates using a machine that supports, transports, distributes and grades the ice aggregate and bond water, comprising the steps of positioning the machine adjacent a first area over which the road is desired to be formed, distributing and grading ice particles over the first area with the machine, applying bond water to the top surface of the ice particles in the first area with the machine, moving the machine onto the bonded ice particles in the first area (which may be performed immediately following the preceding step), and repeating the preceding steps for a second area adjacent the first area.

In accordance with yet another aspect of the present invention, there is provided a roadway for cold climates which comprises an ice aggregate from which substantially all ice particles smaller than a predetermined size have been removed, and a bonding layer formed in the upper portion of the ice aggregate. The bonding layer comprises an ice layer formed by applying bond water to the upper portion of the ice aggregate, while the predetermined size of ice particles is approximately 0.1 inch in diameter. The thickness of the bonding layer is dictated by required structural strength, and will be generally in the range of 6–12 inches.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Method

The technique of the present invention may be summarized as follows. Initially, ice must be mined or harvested from any convenient source, such as lake ice. The ice may be harvested by any conventional equipment, such as a bulldozer.

The ice is then crushed to a reasonably uniform gradation having particles with a maximum size of, for example, three to four inches in diameter. Commercially available ice crushers or breakers may be employed for this purpose, such as Model 60-300 manufactured by the Lilly Company of Memphis, Tenn.

The preceding two steps may be combined by an in-situ ice crushing step that combines both the harvesting and crushing processes. This may be achieved, for example, by a roto-tiller type of device.

The next step in the technique of the present invention is to remove from the crushed ice aggregate substantially all of the "fines", i.e., ice particles smaller than approximately 0.1 inch. The "fines" removal may be achieved by screening the crushed ice by the use of, for example, flat deck screens or sieves, a rotary drum screener, or the like. Although the theory underlying the importance of removing the fines from the crushed ice aggregate is not fully understood, I have discovered that, for a given ambient temperature, if the percentage of ice particles measuring 0.1 inch in diameter and less of the gradation exceeds a certain value, it is not possible under any conditions to construct a bond layer of sufficient strength in high latitude climates for wheeled equipment utilization. Inasmuch as specified fines control would be difficult, if not impossible, under field conditions, the technique of the present invention employs an ice aggregate from which substantially all fines have been removed.

Having removed the fines, the resultant ice aggregate is then transported by any conventional means (e.g., truck, belt conveyor, auger) to the site desired for the road or other structure. In this step, however, the fragile nature and tendency to segregate of the crushed ice must be taken into account, and therefore pneumatic conveying, slinging or the like, of the crushed ice aggregate should be avoided.

The next step in the technique of the present invention is to place the resulting ice aggregate to the desired grade without surface work or compaction. A preferred embodiment of a machine to perform this step will be described in greater detail hereinafter.

The crushed ice aggregate, having been placed to the desired grade, is then bonded in its upper thickness by spraying, in either a single pass or in multiple passes, its free surface with preferably heated bond water. The bond water is preferably emitted from spray nozzles contained within an enclosure that effectively seals the space between the nozzles and the crushed ice surface to contain the spray water within a vapor saturated region. Without such an enclosure, I have found that, at sub-zero temperatures, the ice aggregate, having had all fines removed, may be sealed from penetration by the bond water. This was believed due to evaporation of the bond water in transit from the spray nozzles to the ice aggregate, and possibly from the ice aggregate surface itself, such evaporation being sufficient to cause subcooling of the bond water resulting in the formation of a surface ice sheet that undesirably sealed the ice aggregate surface from further penetration by the bond water. The enclosure, according to the present invention, prevents evaporative cooling of the spray water prior to its contact with the crushed ice surface and provides a near 32° F. environment.

At ice temperatures near and colder than 0° F., the bond water is also preferably heated to a temperature inversely proportional to that of the crushed ice. Experimental results presently indicate that, for example, at $-20°$ F. a 12 inch thick bond layer of considerable strength can be obtained with a bond water temperature of about 100° F. and a bond water quantity on the order of 2.5 pounds per square foot. It has been found that an interrelationship exists between bond water temperature and bond water quantity for a given strength, with a reduction in bond water quantity required as bond water temperature is increased, and vice-versa.

Experimental work has produced ice aggregate roads with thicknesses as great as 3 feet and having a 6–8 inch thick bond layer. Road sections of greater or lesser thicknesses may be constructed with the present invention, as may be desired for particular loading conditions or terrain variations.

Normal wheeled traffic may traverse the bonded crushed ice aggregate within seconds of the final spray pass. This is extremely important in that under certain conditions in the arctic, environmental considerations do not permit traffic over unprotected tundra; hence, a road building system that can be constructed from itself, i.e., essentially "unrolled" across the desired route, is extremely desirable.

Apparatus

The apparatus of the present invention is designed in particular to construct a smooth surface of crushed ice over uneven terrain. The properties of crushed ice, e.g., low density, lack of abrasiveness, flowability, low coefficient of friction and shallow angle of repose, are all taken into account in the preferred embodiment. The machine is designed to operate from the surface that it constructs; that is, after constructing one section of ice aggregate road, the machine is advanced over the completed section to construct the next adjacent section, never coming into actual contact with the terrain. The machine of the present invention is capable of changing grade as may be necessary to ramp-on or ramp-off a structure or to clear a natural obstruction. Means are also provided for permitting construction of super-elevation (banks) into road curves where necessary. The machine of the present invention is totally self-contained and is self-sufficient, requiring only a supply of crushed ice, bond water and fuel, and is designed to be operated by as few as two men. Crushed ice may be transported to the machine over the structure constructed by means of, for example, end dump type vehicles, although other more efficient means of transport may be used for the crushed ice. Bond water may be delivered to the machine in the same manner as the crushed ice, although it is possible that a portion of the delivered crushed ice may be diverted to an on-board ice melter to provide the necessary bond water.

Figures 1, 2, 3, 4:
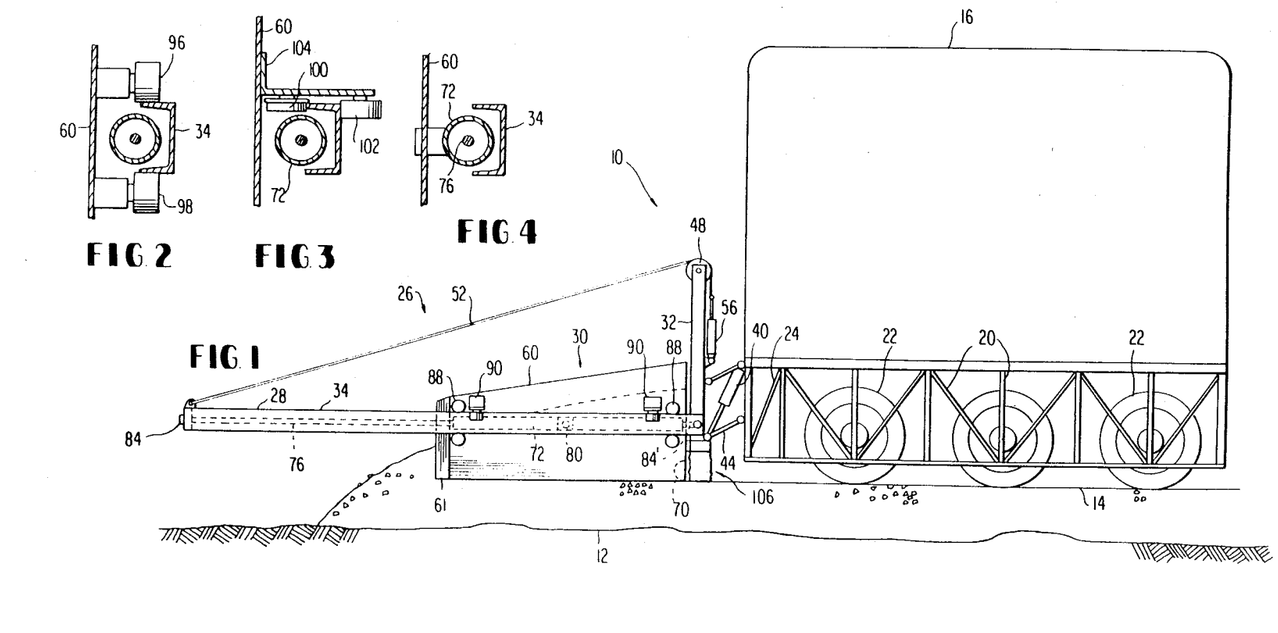
FIG. 1 is a side view in elevation illustrating a preferred embodiment of the apparatus for constructing an ice aggregate road in accordance with the present invention.
FIGS. 2, 3 and 4 are sectional views illustrating various portions of the preferred embodiment illustrating in FIG. 1.

Referring now to the drawings, wherein like reference numerals represent identical or corresponding parts throughout the several views, and more particularly to FIGS. 1–6 thereof, reference numeral 10 indicates generally a preferred embodiment of a crushed ice placement and bonding machine in accordance with the present invention. As illustrated in FIG. 1, the machine 10 moves from the right to the left as the ice aggregate road 14 is being constructed over the underlying terrain 12. The terrain 12 may be, and is usually, an uneven surface, and may consist of ecologically sensitive tundra. The machine 10 of the present invention is designed to construct an ice aggregate roadway 14 over the terrain 12 without having machine contact with the terrain 12 to avoid damage thereto.

The machine 10 of the present invention includes left and right support modules or carriages 16 and 18, the contents and functions of which will be described in greater detail hereinafter. Each module 16 and 18 is supported by a longitudinally extending outrigger frame 20 and transport wheels 22. A main frame 24 extends transversely between modules 16 and 18 at the forward portions thereof.

Mounted to the forward portions of modules 16 and 18 and extending forwardly over the area of the roadway being formed is a distribution and grade box assembly indicated generally by reference numeral 26. The distribution and grade box assembly 26 includes a flexible outer guide frame 28 and a movable, substantially rectangular distribution and grade box or hopper 30.

The outer guide frame 28 includes rear vertical frame members 32 and 32' whose lower ends are connected by a transverse rear frame member 33. This structure provides an open rear end for the frame 28, for a purpose which will be made clear hereinafter.

Frame 28 further includes left and right generally C-shaped side frame members 34 and 36 which are preferably pivotally mounted to the lower parts of vertical frame members 32 and 32' as at 35 and 37, respectively. The forward portions of side frame members 34 and 36 are connected by a front transverse frame member 38.

Frame 28 is connected to the support modules 16 and 18 by means of left and right transport hydraulic cylinders 40 and 42, respectively, and associated four-bar linkages 44 and 46 equipped with lateral sway braces 44' and 46'. This permits the guide frame 28 to be elevated relative to the finished ice aggregate surface 14.

Mounted at the top ends of vertical frame members 32 and 32' are a pair of pulleys 48 and 50, respectively, for supporting cables 52 and 54 which are connected between the front transverse frame member 38 and left and right guide frame warp cylinders 56 and 58, respectively, whose lower ends are secured to vertical frame members 32 and 32'. The cylinders 56 and 58 and associated cable and pulley assemblies permit the angle of the guide frame 28 relative to the finished surface to be adjusted up or down. Further, the guide frame 28 may be tilted transverse to the direction of travel of the machine 10 by differential use of the cylinders 56 and 58. This permits construction of a super-elevation (bank) into a road curve, as necessary.

The distribution and grade box 30 consists of a U-shaped, open bottom box or hopper that includes side walls 60 and 62 which may include at their forward portions slightly inwardly angled edges 61 and 63 for directing the flowing crushed ice inwardly when it is dumped into the box 30. The box 30 includes a forward compression box bracing member 64 connecting the two side walls 60 and 62, and a rear wall 65. A pair of diagonal braces 66 and 68 are also preferably provided and, together with bracing member 64, provide lateral rigidity to the guide frame 28 through the support roller assemblies 88, 90, 92 and 94 of the distribution and grade box 30. At the lower inside edge of rear wall 65 is preferably provided a crushed ice smoothing edge 70 for smoothing the upper surface of the distributed ice aggregate.

The distribution and grade box 30 is adapted for reciprocal movement within frame 28 by means of left and right double rod hydraulic cylinders 72 and 74 which are preferably mounted within the openings of C-shaped side frame members 34 and 36 (see FIG. 4). Reference numerals 76 and 78 indicate the exposed rods of cylinders 72 and 74, respectively. The distribution and grade box 30 is propelled along the guide frame 28 by the attached cylinders 72 and 74 which, due to their double rod action, permit equal travel velocity in either direction for a given hydraulic fluid flow rate.

Cylinders 72 and 74 are attached to the box side walls 60 and 62 by means of trunnions 80 and 82, respectively. The cylinder rods 76 and 78 are attached at each end of frame members 34 and 36 at points 84, 84' and 86, 86'.

Two pairs of support roller assemblies are provided on each side of assembly 26 for coupling the grade box 30 to frame 28. The roller assemblies are indicated generally in FIGS. 1, 5 and 6 by reference numerals 88, 90, 92 and 94. As illustrated with greater particularity in FIGS. 2–4, roller assembly 88, for example, includes upper and lower rollers 96 and 98 connected to the side wall 60 for movement along side frame member 34, while roller assembly 90 includes side rollers 100 and 102 mounted to a common support flange 104 which is also connected to side wall 60. Roller assemblies 92 and 94 are similarly constructed and mounted for movement along side frame member 36.

Figure 8:
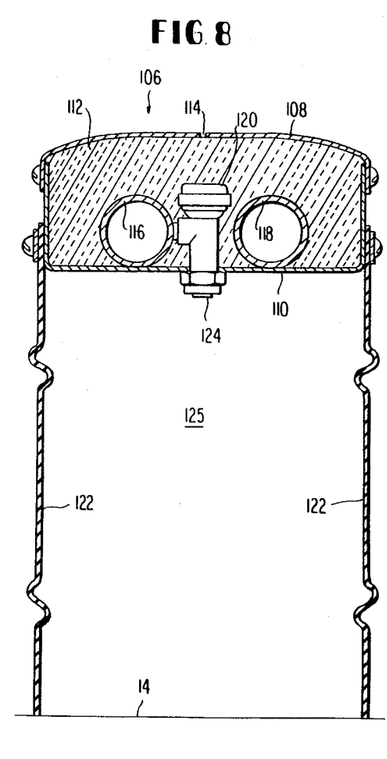
FIG. 8 is an enlarged, sectional view illustrating a portion of the spray bar assembly of the present invention.

Attached to the rear outside bottom edge of rear wall 65 of box 30 is a spray bar assembly indicated generally by reference numeral 106. Referring to FIG. 8, a sectional view through the spray bar assembly 106 is illustrated and is seen to include an upper metal enclosure 108 and a lower metal enclosure 110 within which is positioned insulation 112. A vent 114 is preferably formed in upper enclosure 108. Extending longitudinally within the spray bar assembly 106 is a heated water supply pipe 116 and a heated water return pipe 118. A plurality of spray nozzles 124 are connected in parallel in communication with supply pipe 116. Each preferably include a diaphragm check valve control 120 which requires a certain minimum pressure in supply pipe 116 for delivering the bond water supply to spray nozzle 124. Any of the bond water not emitted by the individual spray nozzles 124 is returned to circulate through the system via return pipe 118, as will be described in greater detail hereinafter.

Extending downwardly from the enclosures 108 and 110 of spray assembly 106 to the top surface of the ice aggregate 14 is a flexible skirt 122 which may be formed, for example, of Hypalon, a synthetic rubber material which remains flexible at −40° F. The provision of skirt 122 provides an enclosed vapor-saturated region 125 in the spray area to prevent evaporative cooling of the spray bond water prior to its impingement upon ice aggregate surface 14. In addition to containing the water vapor to prevent further evaporation and consequent cooling, flexible skirt 122 prevents any appreciable build-up of frozen water on its surface. The spray bar assembly 106 is attached to the rear of distribution box 30 with sufficient clearance to permit flexing of the skirt 122 and consequent spalling-off of collected ice.

Figure 7:
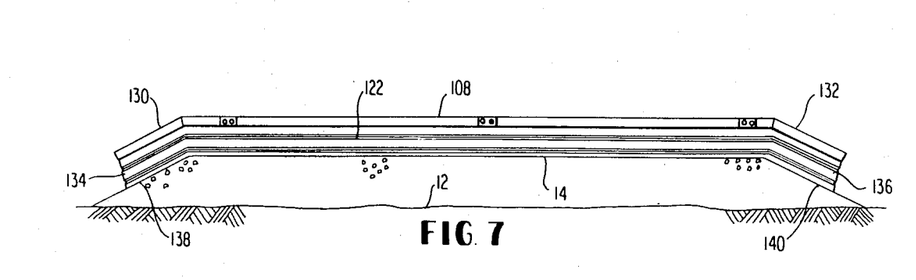
FIG. 7 is an end view which schematically illustrates the placement of the spray bar assembly over the ice aggregate road in accordance with the present invention.

Referring now to FIG. 7, reference numerals 130 and 132 indicate side extensions of the spray bar assembly which slope downwardly to permit bonding of side slopes 138 and 140 of the ice aggregate road 14 if desired. The slope bonding spray bar extensions 130 and 132 include skirt sections 134 and 136, respectively, which serve the same function as the main skirt 122 described above.

Figure 9:
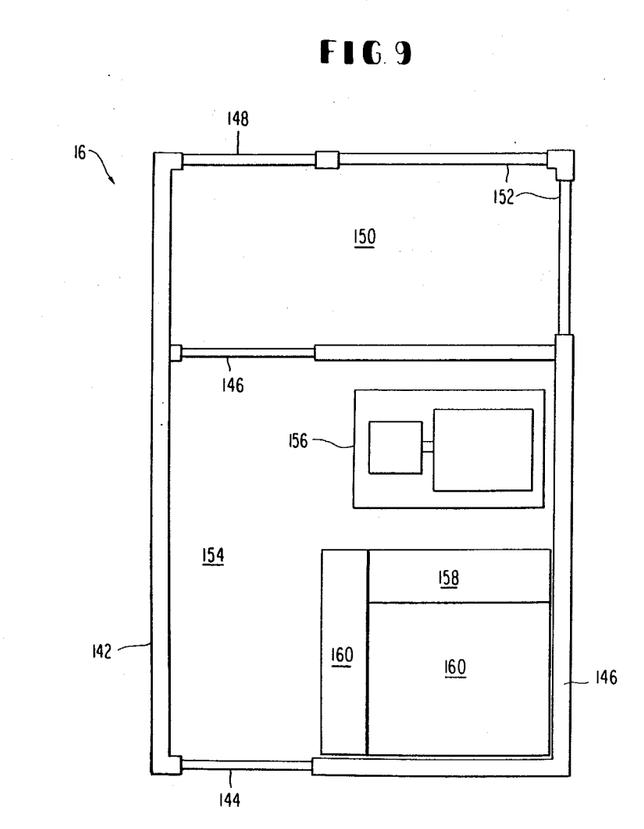
FIGS. 9 and 10 are schematic illustrations of the wheeled support modules or carriages of the machine of FIGS. 1 and 5.

Referring now to FIG. 9, there is illustrated a top sectional view of the left support module or carriage 16 which typically may include insulated walls 142 and a plurality of access doors 144, 146 and 148. Reference numeral 150 indicates an operator control area having windows 152. Reference numeral 154 indicates an equipment area which may include, for example, an engine/generator 156, a fuel storage area 158, a bond water storage tank 160 and a fuel and water transfer mechanism 162 which may include hydraulic pumps, for example.

Figure 10:
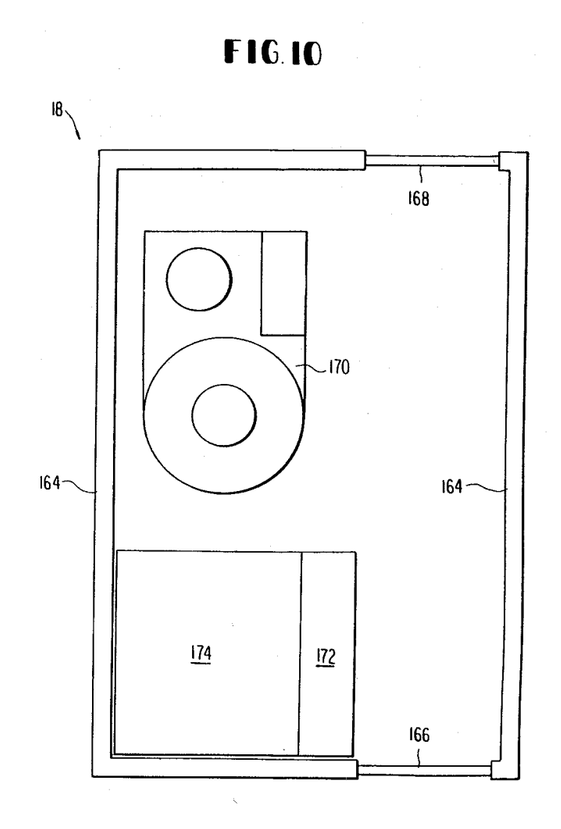

The right support module or carriage 18 is illustrated schematically in FIG. 10 and is seen to include insulated walls 164 and access doors 166 and 168. Reference numeral 170 indicates an intermediate fluid heater for bond water, while reference numeral 172 indicates a heat exchanger and circulating pump assembly. Bond water storage is provided in module 18 by bond water storage tank 174.

Figure 11:
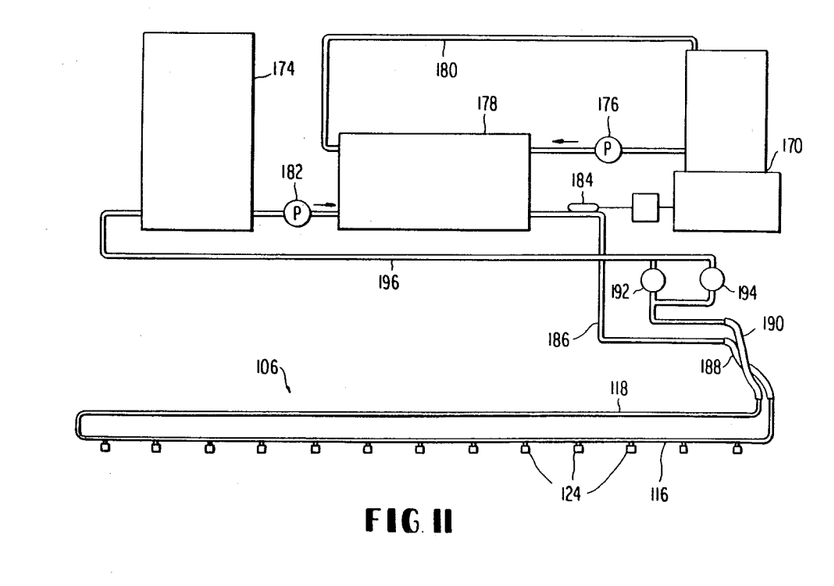
FIG. 11 is a diagramatic view illustrating the spray bar assembly and control components associated therewith.

Referring now to FIG. 11, there is illustrated a schematic representation of a heating and circulating system for the bond water which may be utilized with the preferred apparatus and technique of the present invention. Reference numeral 170 indicates a fluid heater for an intermediate, non-freezing fluid, such as anti-freeze. A fluid circulating pump 176 pumps the intermediate fluid through heat exchanger 178 and conduit 180 back to fluid heater 170. Bond water contained in storage tank 174 is pumped by circulating pump 182 through heat exchanger 178 where it is heated to the desired temperature. The heated bond water from heat exchanger 178 is fed through delivery pipe 186 to the heated water supply pipe 116 of spray nozzle assembly 106 via a flexible hose 188 connected between the modules and the spray assembly. The return path for the excess heated water is by way of return pipe 118, another flexible hose 190 and pipe 196 to heated bond water supply tank 160. Pump 182 insures continuous circulation of the heated bond water through the spray nozzle assembly 106 to prevent freezing of the bond water. Between the return pipe 118 and pipe 196 is positioned a pressure control valve 192 which is set by the operator to establish the required spray nozzle pressure for the desired quantity of bond water to emanate from the diaphragm controlled spray nozzles 124 in supply line 116. A manual control valve 194 is preferably connected in parallel with valve 192 and is used by the operator to bypass valve 192 to thereby reduce the pressure in pipes 116 and 118 below the set point of the diaphragm check valves 120 (see FIG. 8) to thereby prevent water spray without stopping the circulation of the heated water. A temperature sensor 184 is provided adjacent line 186 to control the fluid heater 170 to maintain the bond water temperature at an operator controlled set point which will be a function of the ambient temperature.

Figure 5:
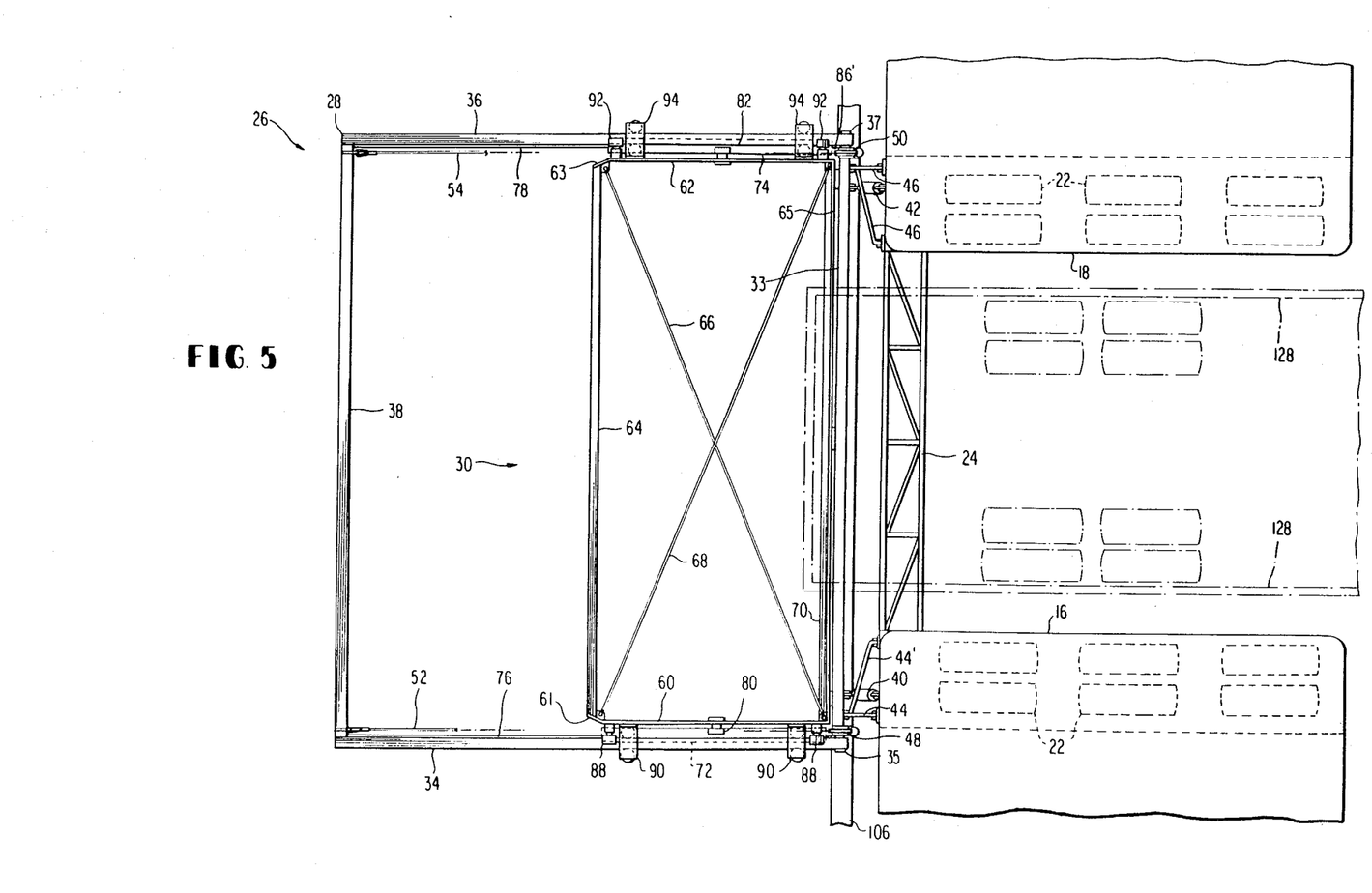
FIG. 5 is a top view of the preferred embodiment of the machine of FIG. 1.
Figure 6:
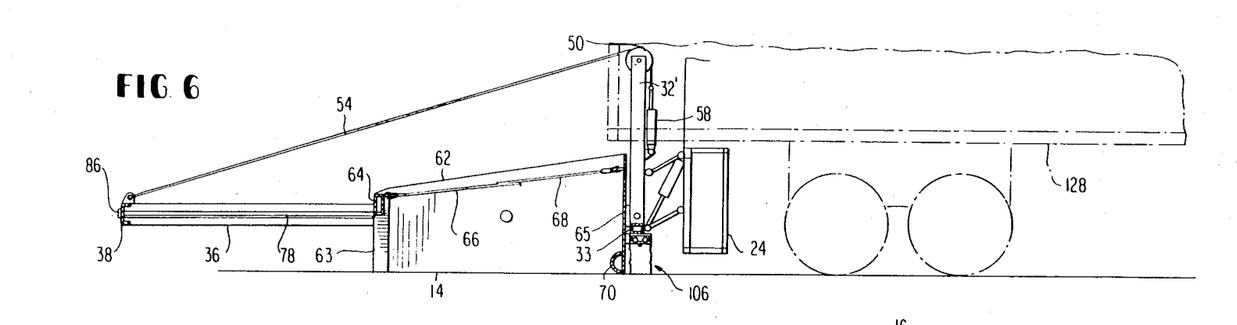
FIG. 6 is a partial, longitudinal sectional view of the preferred embodiment illustrated in FIG. 5.

In operation, after harvesting, crushing and removal of the detrimental fines, the resultant ice aggregate is dumped into the distribution and grade box 30 by means of a conventional crushed ice transporter 128 which is adapted to be positioned between the support modules 16 and 18 as illustrated in FIGS. 5 and 6. The rear dump type truck 128 is simply backed over the finished ice aggregate surface 14 into the space between the support modules 16 and 18 and its contents are discharged over the forward, transverse main frame 24 into the distribution box 30.

The ice aggregate is distributed and graded by the forward travel of the box 30 propelled by the double rod cylinders 72 and 74 while the support modules 16 and 18 are held stationary. The box 30 may be caused to travel to the end of the distribution box guide frame 28 if sufficient crushed ice is available, or to some intermediate point. During forward travel of box 30 (from right to left as illustrated in FIG. 1), the crushed ice therein is distributed and graded by the rear wall 65 and the crushed ice smoothing edge 70 in combination with the side walls 60 and 62. Spraying of the bond water may occur during the distribution and grading pass, or in a subsequent pass or passes. In either event, the distribution box 30 is traversed back and forth within the limits established by the quantity of crushed ice available and the terrain fill requirements until the desired number of spray passes have been effected. In the preferred embodiment, two or three spray passes have been found to be sufficient to establish the desired depth of penetration of bond water; however, under certain circumstances, more or less bond water passes may be used. It is believed from present investigations that the strength of the final structure increases with the number or bond water passes.

Once the requisite number of spray passes have been made, the guide frame 28 is lifted by the transport cylinders 40 and 42 and the machine is propelled forward by the support and transport wheels 22 until the forward edge of the bonded ice aggregate is beneath the spray bar assembly 106. Alternatively, the guide frame 28 may simply be slid along the bonded crushed ice until the unbonded crushed ice edge is reached.

When the machine 10 has been transported forward to the unbonded crushed ice edge, the guide frame 28 is lowered until the rear of the distribution box 30 is at the elevation of the bonded ice aggregate. The slope and warp of the frame 28 may then be adjusted if any change is to be made for the next section of road by means of the cylinders 40 and 42. Additional crushed ice is then dumped into the distribution box 30, if needed, and the foregoing process is repeated. Incremental slope and warp changes will ordinarily be less than 1°-2°, and can therefore be easily accommodated by the flexible guide frame and distribution box.

During operation of the machine, flow of the bond water will be continuous through the piping system illustrated in FIG. 11 in order to maintain freeze protection. When bond water is to be applied, the pressure in the flow loop is increased to a value above the opening pressure of the diaphragm check valves and to that required for the design flow through the respective nozzles. At the end of the spray cycle, the pressure is reduced and the check valves close. The heated bond water flowing through the pipes in contact with the bottom of the metal enclosure (note FIG. 8) will prevent freezing of the water nozzles 124 through conduction. In the event that insufficient heat is available for this purpose, supplemental heat may be provided, for example, by electric heat cables strategically located near the nozzles.

As may be appreciated from the foregoing, the machine of the present invention is capable of constructing an ice aggregate roadway continuously from the surface of the structure being built, thereby avoiding machinery contact with the underlying terrain. This feature is of extreme importance in those areas where the substrate over which the temporary structure is being built is ecologically sensitive to high ground pressure loading as occurs with most conventional construction equipment. The present invention produces a smooth, finished, free surface regardless of irregularities in the terrain. The preferred embodiment of the machine may be readily disassembled into units of such volume and weight as to be easily moved into remote areas by helicopter for use in the construction of, for example, air strips for large cargo carrying aircraft, or the like.

The technique of the present invention permits high latitude wintertime construction seasons to be extended by both earlier construction in the Fall and later utilization in the Spring than is commonly found with more conventional snow construction techniques.

Obviously, numerous modifications and variations of the present invention are possible in light of the above teachings. It is therefore to be understood that within the scope of the appended claims, the invention may be practiced otherwise than as specifically described herein.

I claim as my invention:

1. Apparatus for constructing an ice aggregate road, which comprises:
    means adapted to receive ice aggregate and distributing the ice aggregate over a portion of the route desired for said road, said receiving and distributing means comprising hopper means including side walls, an open top for receiving, an open bottom for distributing and a rear wall for grading said ice aggregate over said portion of said route; and
    means operatively coupled to sad receiving and distributing means for applying bond water to the top surface of the distributed ice aggregate, said bond water applying means positioned rearwardly of and adjacent to said rear wall of said hopper means and comprising a plurality of spray nozzles connected to a common source of bond water and positioned in a spaced relationship to the top surface of the distributed portion of said ice aggregate and means for providing a substantially vapor saturated region between said spray nozzles and said top surface.

2. The apparatus as set forth in claim 1 wherein said means for providing a substantially vapor saturated region comprises means for substantially enclosing the area between said spray nozzles and said top surface of said ice aggregate.

3. The apparatus as set forth in claim 2, wherein said enclosing means comprises a flexible skirt.

4. Apparatus for constructing an ice aggregate road, which comprises:
    means adapted to receive ice aggregate and distributing the ice aggregate over a portion of the route desired for said road; and
    means operatively coupled to said receiving and distributing means for applying bond water to the top surface of the distributed ice aggregate; said means for applying bond water including means for preventing evaporative cooling of said bond water before it reaches said top surface.

5. The apparatus as set forth in claim 4, wherein said applying means further comprises at least one spray nozzle means for receiving bond water from a source and positioned above said top surface of said ice aggregate.

6. The apparatus as set forth in claim 5, wherein said means for preventing evaporative cooling of said bond water comprises skirt means extending from said spray nozzle to said top surface for forming a substantially vapor saturated region about the bond water spray issuing therefrom.

7. The apparatus as set forth in claim 6, wherein said skirt means comprises a flexible material.

8. The apparatus as set forth in claim 5, wherein said bond water applying means comprises:
    a source of bond water;
    a supply pipe for delivering bond water to said plurality of spray nozzles from said source;
    a return pipe for returning unsprayed bond water back to said source; and
    means for causing continuous circulation of said bond water through said source, said supply pipe and said return pipe.

9. The apparatus as set forth in claim 8, wherein said plurality of spray nozzles each include check valve means for preventing spraying of bond water therefrom until the pressure in said supply pipe exceeds a predetermined amount.

10. The apparatus as set forth in claim 8, wherein said plurality of spray nozzles are arranged substantially linearly across the rear edge of said distributing means.

11. The apparatus as set forth in claim 8, wherein said means for preventing evaporative cooling of said bond water comprises a flexible skirt enclosing said plurality of spray nozzles and extending therefrom to the top surface of said ice aggregate.

12. A roadway for cold climates, comprising:
    a roadway base layer of ice aggregate from which substantially all ice particles smaller than approximately 0.1 inch in diameter have been removed; and
    a bonding layer formed in the upper portion of said ice aggregate.

* * * * *